No. 747,974. PATENTED DEC. 29, 1903.
D. B. JACKSON.
WELL OR CISTERN CLEANER.
APPLICATION FILED SEPT. 4, 1903.
NO MODEL.
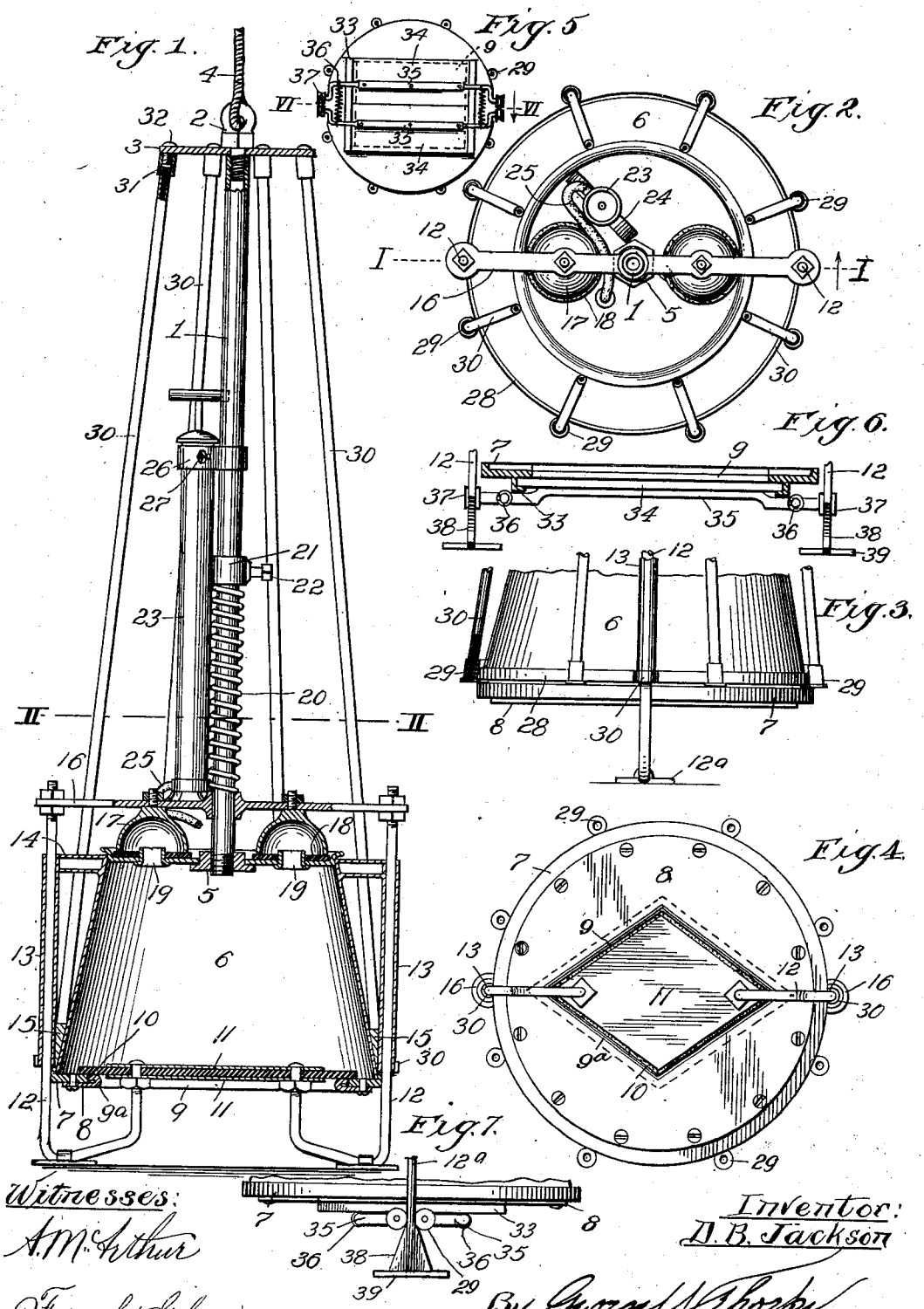
Witnesses:
A. McArthur
Frank Glore
Inventor:
D. B. Jackson
By George J. Thorpe
Atty No. 747,974. Patented December 29, 1903.

UNITED STATES PATENT OFFICE.

DANIEL B. JACKSON, OF WARRENSBURG, MISSOURI.

WELL OR CISTERN CLEANER.

SPECIFICATION forming part of Letters Patent No. 747,974, dated December 29, 1903.

Application filed September 4, 1903. Serial No. 171,949. (No model.)

*To all whom it may concern:*

Be it known that I, DANIEL B. JACKSON, a citizen of the United States, residing at Warrensburg, in the county of Johnson and State of Missouri, have invented certain new and useful Improvements in Well or Cistern Cleaners, of which the following is a specification.

My invention relates to well or cistern cleaners; and my object is to produce an apparatus of this character by which a well or cistern or other small body of water can be thoroughly and efficiently cleaned of mud, pieces of rock up to a certain size, and other foreign substances.

A further object is to produce an apparatus by which the water may be purified and objects too large to enter the apparatus caused to rise to the surface of the water, that they may be grappled and removed.

A still further object is to produce an apparatus of the character named which can be operated easily and quickly without regard to the depth of water and which is of simple, strong, durable, and comparatively inexpensive construction.

To these ends the invention consists in certain novel and peculiar features of construction and combinations of parts, as hereinafter described and claimed, and in order that it may be fully understood reference is to be had to the accompanying drawings, in which—

Figure 1 is a central vertical section of a well or cistern cleaner embodying my invention, the section being taken on the line I I of Fig. 2. Fig. 2 is a horizontal section on the line II II of Fig. 1. Fig. 3 is a side elevation of the lower part of the apparatus. Fig. 4 is an inverted plan view of the apparatus. Fig. 5 is an inverted plan view showing the bottom valve of modified form. Fig. 6 is a section on the line VI VI of Fig. 5. Fig. 7 is a side elevation to show clearly the means for opening the valve of Figs. 5 and 6.

Referring to the drawings in detail, 1 designates a tubular stem internally threaded at its upper end and externally threaded as at its lower end. 2 is a bolt screwed in the upper end of said stem and clamping thereon a top plate 3, said bolt being preferably attached to the end of a cable 4, by which the apparatus is lowered into or lifted out of the well or cistern to be cleaned.

5 is a nut upon the lower end of the stem and secured rigidly in any suitable manner to the top of the frustum-shaped box 6. The bottom of said box is formed of a ring 7 and a plate 8, screwed or riveted thereto and projecting inward thereof, said plate being formed with a central opening 9, which may be of the diamond shape shown in Fig. 4 or of any other suitable or preferred configuration, the plate at the margin of the opening being bent, as at $9^a$, so as to form a bearing for the rubber valve 10. Said valve is stiffened and protected by the metallic plates 11, secured to the upper ends of the short arms of the vertical and diametrically opposite hooks 12, said hooks extending through cylindrical sleeves 13, rigidly connected at their upper and lower ends to the box, as at 14 and 15, respectively, or in any other suitable or preferred manner. Rigidly connecting the upper ends of said hooks is a cross-head 16, which slidingly engages the stem 1, and secured rigidly to and depending from said cross-head are the inverted cup-valves 17, adapted to make air-tight connections with the rubber or leather washers 18, cemented or otherwise secured to the top of the box around the air-tubes 19, secured in said top and projecting up through said washers. The cup-valves are normally held with a yielding pressure in engagement with said washers by means of the spring 20, encircling the stem and bearing at its lower end upon the cross-head 16 and at its upper end against the collar 21, secured upon the stem at the desired point by means of set-screw 22, the adjustment of said collar downward or upward obviously increasing or diminishing the pressure of the cup-valves upon the washers and of the valve 10 upon the bent or rolled flange $9^a$ of the bottom plate, the parts being so proportioned that the engagement of the cup-valves with the washers and the valve with the bottom shall be simultaneous.

23 designates a pump of the type shown or of any other suitable or preferred construction, which is secured rigidly upon the top of the box by a foot-piece, as at 24, and is provided with the usual tube 25, which is connected to the box, so as to deliver the air into the latter. To assist in holding the pump in its upright position contiguous to the stem 1, a band connects the two and is preferably clamped thereon by means of a set-screw 27 or in any other suitable or preferred manner.

To brace and strengthen the connection between the box 6 and stem 1, a band 28 encircles the lower end of the box and is provided with rigid inverted caps 29 to receive the lower ends of the hollow pipes or tubes 30. Said pipes or tubes extend convergingly upward and are united to top plate 3 preferably by means of couplings 31 and screw-bolts 32, though of course any other suitable connection may be employed.

To clean the cistern or well, the operator first pumps air into the receptacle or box until it attains the required pressure. He then by means of the rope lowers the apparatus into the well or cistern, its weight, of course, being sufficient to sink it irrespective of the volume of air stored in the box. When it reaches the bottom, the hooks sink into the mud until arrested by contact with the bottom, and in this connection it should be stated where the mud is accumulated to a considerable depth the hooks are preferably provided with flat wings, as at 12$^a$, at their lower ends, so as to give a wide bearing-surface, which will pack the mud so that, like the bottom, it will offer sufficient resistance to farther downward movement of the hooks to overcome that of the spring 20. The result in either case is that the box slides downward upon the hooks so as to simultaneously effect the disengagement of the box-bottom with the valve and the washers with the cup-valves. As this action takes place and it is assisted by the pressure of the mud or other foreign substances against the bottom plate 11 of the valve the air escapes with great force up through tubes 19 and creates a suctional action, which draws the mud up into the box through the bottom opening 9. In fact, such suctional action in practice is sufficiently great to not only draw up all of the mud which is directly under the box, but also pieces of brick or rock which are sufficiently small to enter the box through the opening around the valve. The escape of the air into the water is with such force that it causes the latter to well or rise up several feet, the disturbance being sufficient to cause the body of an animal to rise to the surface, where it can be grappled and removed. The supply of live air at the same time purifies the water, as will be readily understood. As the operator starts to withdraw the apparatus from the well or cistern the spring 20 reseats the valve and incidentally the cup-valves, which parts must be again unseated at the point where it is desired to discharge the contents of the box, the spring 20 instantly reseating said valve and cup-valves after such operation is performed in order that the operator may again manipulate the pump and recharge the box with air. The apparatus is then again lowered into the well or cistern at a different point and the operations described are repeated. These various operations are repeated until practically the entire bottom of the well or cistern has been covered, and therefore thoroughly cleaned.

The apparatus, as stated, will not only remove objects which are sufficiently small to enter the box, but will also withdraw a sunken timber where it is possible to get an end of the same between the valve and the bottom plate, though for the purpose of raising objects of that nature my modified form of valve is preferred, as the type shown in Figs. 1 and 4 will only receive a comparatively short object unless an end happens to be clamped therein, as above explained.

In Figs. 5, 6, and 7 the bottom is shown with a rectangular opening 9, as indicated by dotted lines, and at opposite ends of said opening cleats 33 depend to receive the slide-valve, composed in this instance of two sections 34, which meet at the center of the opening. These sections are secured to bars 35, connected by retractile springs 36 to hold the valve normally closed, and said bars are equipped with longitudinally-grooved rollers 37 at their ends, between which vertical rods 12$^a$, corresponding to the long arms of hooks 12, extend, said rods being provided at their lower ends with wedges 38, terminating in flat bases 39, the arrangement being such that when said flat bases strike the bottom of the well or cistern or compress the mud on such bottom until it will yield no longer the rollers 37 will ride down upon the wedges 38 and force the sections of the valve apart simultaneously with the disengagement of washers 18 with the cup-valves, the result being that the foreign substance to be removed is drawn into the box. As the operator starts to elevate the apparatus the spring 20, as before, effects the proper movement of the box to cause the cup-valves 17 to reëngage the washers and permit springs 30 to draw the sections of the valve together and close the opening 9. With this type of valve it is obvious that provision may be made for the entrance into the box of comparatively large objects, and it is also obvious that it will more conveniently receive the ends of long objects, such as sunken timbers.

From the above description it will be apparent that I have produced an apparatus of the character described which embodies the features of advantage enumerated as desirable in the statement of invention and which in many instances can be used to great advantage in searching for the bodies of drowned persons or animals in ponds or rivers, it being of course understood that for such purposes the apparatus should be of suitable capacity and for efficient operation must be disposed close to the body sought. In cases of this sort it is not essential that the device should be large enough to receive the body, as the disturbance created in the water under the expulsion of air under heavy pressure is sufficient to cause the body to rise to the surface.

While I have illustrated and described the preferred embodiment of the invention, it is to be understood that various changes may be resorted to in its detail construction, form, arrangement, and proportion without departing from the spirit and scope of the invention or sacrificing any of its advantages and that under certain circumstances where it is to be used at points to which it cannot be lowered by the rope the brace-tubes 30 can be disengaged and coupled endwise to each other and to the stem 1, so as to produce a long stiff handle, by which it can be lowered at the angle required. With this handle it can obviously be used to remove accumulations of mud from the side of the well or cistern, and in this connection also it is desired to call attention to the fact that the water is free to enter the hollow braces 30, (see Fig. 3,) so as to increase the weight, and thereby facilitate the lowering of the apparatus without undesirably adding to its weight when out of the water.

Having thus described the invention, what I claim as new, and desire to secure by Letters Patent, is—

1. A well or cistern cleaning apparatus, comprising a box having a bottom opening, one or more openings above the bottom opening, and a rigid stem; valves for said openings, means for holding the valves closed with a yielding pressure; a cross-head slidingly mounted on the stem and carrying the valve or valves for the last-named openings; parts depending from the cross-head and projecting beyond the bottom of the box; and connections between said parts and the bottom valve whereby relative movement of said parts and box shall effect the simultaneous seating or unseating of said valves.

2. A well or cistern cleaning apparatus, comprising a box having a bottom opening, one or more openings above the bottom opening, and a rigid stem; valves for said openings, means for holding the valves closed with a yielding pressure; a cross-head slidingly mounted on the stem and carrying the valve or valves for the last-named openings; parts depending from the cross-head and projecting beyond the bottom of the box; connections between said parts and the bottom valve whereby relative movement of said parts and box shall effect the simultaneous seating or unseating of said valves; and means for introducing air under pressure into the box.

3. A well or cistern cleaning apparatus, comprising a box having a bottom opening, one or more openings above the bottom opening, and a rigid stem; valves for said openings; means for holding the valves closed with a yielding pressure; a cross-head slidingly mounted on the stem and carrying the valve or valves for the last-named openings; parts depending from the cross-head and projecting beyond the bottom of the box; connections between said parts and the bottom valve whereby relative movement of said parts and box shall effect the simultaneous seating or unseating of said valves; and a pump secured to the box and stem and connected to introduce air into the former.

4. A well or cistern cleaning apparatus, comprising a box having a bottom opening, one or more openings above the bottom opening, and a rigid stem; valves for said openings; means for holding the valves closed with a yielding pressure; a cross-head slidingly mounted on the stem and carrying the valve or valves for the last-named openings; parts depending from the cross-head and projecting beyond the bottom of the box; connections between said parts and the bottom valve whereby relative movement of said parts and box shall effect the simultaneous seating or unseating of said valves; and a cable attached to the top of the stem for lowering the apparatus into or drawing it out of the well or cistern.

5. A well or cistern cleaning apparatus, comprising a box having a bottom opening, one or more openings above the bottom opening, and a rigid stem; valves for said openings; means for holding the valves closed with a yielding pressure; a cross-head slidingly mounted on the stem and carrying the valve or valves for the last-named openings; parts depending from the cross-head and projecting beyond the bottom of the box; connections between said parts and the bottom valve whereby relative movement of said parts and box shall effect the simultaneous seating or unseating of said valves; a top plate secured to the stem; upwardly-converging braces between the box and said top plate; and a cable attached to the apparatus to raise or lower it.

6. A well or cistern cleaning apparatus, comprising a box having a bottom opening, one or more top openings, and a rigid stem projecting centrally from the top; a cross-head slidable on the stem; a valve or valves secured to the cross-head; hooks depending from the cross-head; a valve secured to the hooks above the bottom of and within the box; and a spring pressing the cross-head toward the box and holding the valves closed.

7. A well or cistern cleaning apparatus, comprising a box having a bottom opening, one or more top openings, and a rigid stem projecting centrally from the top; a cross-head slidable on the stem; a valve or valves secured to the cross-head; hooks depending from the cross-head; a valve secured to the hooks above the bottom of and within the box; a spring pressing the cross-head toward the box and holding the valves closed, and a pump secured to the apparatus and adapted to deliver air into the box thereof.

8. A well or cistern cleaning apparatus, comprising a box having a bottom opening and tubes projecting from its top and surrounded by compressible washers; a rubber valve within and adapted to seat upon the bottom and close its opening; cup-valves to seat upon the washers and close the upper ends of said tubes; a cross-head slidable on the stem and carrying said cup-valves; hooks depending from the cross-head and secured to the bottom valve; and a spring holding said valves normally closed.

In testimony whereof I affix my signature in the presence of two witnesses.

DANIEL B. JACKSON.

Witnesses:
G. E. PREWITT,
W. R. MAHAFFEY.